Patented Dec. 24, 1946

2,413,259

UNITED STATES PATENT OFFICE 2,413,259

POLYACRYLIC AND POLYMETHACRYLIC RESINS PLASTICIZED WITH HIGH BOILING AROMATIC OILS

Frank J. Soday, Swarthmore, Pa., assignor to The United Gas Improvement Company, a corporation of Pennsylvania No Drawing. Application September 19, 1942,
Serial No. 458,997

8 Claims. (Cl. 260—36)

1

The present invention relates to new compositions of matter and to methods for their preparation.

More particularly, this invention pertains to the use of the high-boiling aromatic oil separated from tar formed during the production of combustible gas by processes involving the pyrolytic decomposition of petroleum oil with or without the aid of catalysts as plasticizing agents for resins and plastics produced by the polymerization of acrylic acid and its derivatives particularly polyacrylic and polyalkyl acrylic resins.

Of the latter the more preferred are the polymethacrylic resins, and, for convenience, the invention will be generally described in connection with the use of polyacrylic and polymethacrylic resins.

It is the object of the present invention to provide new compositions of matter comprising the high-boiling aromatic oil separated from petroleum oil gas tar and one or more resin or plastic of the type described. Another object of the invention is the provision of a high-boiling aromatic oil which is suitable for use alone or in combination with other substances as a softener or plasticizing agent for lacquers containing one or more polyacrylic and/or polymethacrylic compounds. A further object of the invention is the provision of new molding compositions comprising a high-boiling aromatic oil in combination with one or more such resins or plastics. Other objects and advantages of the invention will be apparent to those skilled in the art from the following description.

A feature of the invention is the provision of adhesives, paper and textile treating agents, leather treating agents, special inks, binders, coating and impregnating compositions, putties, sealing agents, and the like, comprising one or more polyacrylic and/or polymethacrylic resinous and/or plastic materials (referred to herein generally as resins) and aromatic oil of the type described.

Other ingredients, such as waxes, rubber, both natural and synthetic, elastomers in general, derivatives of rubber or elastomers, drying oils, pigments, extenders, fillers, organic dyes and coloring agents, driers, and solvents may be incorporated in compositions of the type described for specific applications, if desired.

While the use of certain aromatic hydrocarbons such as naphthalene, anthracene, and phenanthrene have been suggested for use as plasticizers for certain synthetic resins, such as polystyrene, the use of such aromatic hydrocarbons for this purpose has not met with general acceptance in the industry. This has been due mainly to the fact that such crystalline materials tend to volatilize or sublime from the surface of the resin or plastic with which they have been incorporated, thus impairing or destroying the transparency and/or finish of the article or object in question.

I have discovered that aromatic hydrocarbon oil boiling above 210° C., said oil having been separated from tar produced during the production of gas by a process involving the pyrolytic decomposition of petroleum oil with or without the aid of catalysts, is unusually well adapted as a softening agent for polyacrylic and/or polymethacrylic resin.

Such high-boiling aromatic oils are preferred, which have a preponderant portion boiling above approximately 250° C.; still more preferred are those having a preponderant portion boiling above approximately 275° C.; even more preferred are those having a preponderant portion boiling above approximately 300° C.; and especially preferred are those having a preponderant portion boiling above approximately 325° C. For certain purposes, it may be preferred to employ high-boiling aromatic oils of this type which boil substantially within certain ranges, for example, between 225 and 450° C., more preferably between 300 and 450° C., and still more preferably between 325 and 450° C., though for other purposes relatively narrow cuts confined to the lower boiling ranges may be preferred.

The excellent results obtained when such aromatic oils are used as plasticizing and/or softening agents for polyacrylic and/or polymethacrylic materials are due largely to the exceptional solubility and low volatility characteristics of such oils, as well as to their excellent compatibility with resinous and/or plastic materials in general. Their solubility characteristics are of particular value when preparing resin-plasticizer compositions, largely reducing the time ordinarily required to prepare such blends.

In addition, the exceptionally low viscosity characteristics of aromatic oils of the type described greatly assists in the blending operations, and insures rapid and complete penetration.

Aromatic oils of the type described are exceptionally stable, and are strongly resistant to decomposition, thus insuring the production of uniform compounds and finished articles free from decomposition products. Such compounds, and the finished articles prepared therefrom, possess very good aging characteristics.

Aromatic oils of the type described herein are extracted and/or distilled products, consequently they contain very little, if any, free carbon or other extraneous materials. This is of considerable importance from the standpoint of the preparation of clean, uniform resin-plasticizer compositions.

It has been discovered that very considerable quantities of high-boiling aromatic oils of the type described are contained in the tar produced in the vapor phase pyrolysis of crude petroleum oil or a fraction or fractions thereof such as, for example, gas oil or residuum oil. This is particularly so in the case of petroleum oil gas tar produced when the pyrolysis is conducted at relatively high temperatures, such for example as in the manufacture of oil gas or carburetted water gas at average set temperatures above 1300° F. and at close to atmospheric pressures and also particularly so when the oil pyrolyzed is naphthenic, such as a crude oil classifiable in classes 5 to 7 inclusive, according to the method of classification described in Bureau of Mines Report of Investigations 3279, or a fraction or fractions of such an oil. However, petroleum oils of other classes than 5 to 7 may be employed.

Recently, methods have been developed for the recovery of unusually large quantities of aromatic hydrocarbon boiling in the ranges set forth, from petroleum oil gas tar, produced in the manufacture of gas, such for example, as carburetted water gas, oil gas, or the like. These methods recover high-boiling aromatic oils which are unique in character. The usual distillation procedures employed for the purpose of petroleum tar dehydration and fractionation have been such as to polymerize the readily heat polymerizable monomers boiling above 210° C., which are frequently present in large proportions, into heavy polymers, which became inextricably mixed with the heavy black pitch constituents and with the higher-boiling non-heat polymerizable aromatic oils present. As a result, the high-boiling non-heat polymerizable aromatic oils were retained by the residual tar or pitch.

In copending application Serial Number 370,608, filed December 18, 1940, by Edwin L. Hall and Howard R. Batchelder, which has matured into Patent 2,387,259, granted October 23, 1945, high-boiling aromatic hydrocarbon oils containing heat polymerizable monomeric aromatic hydrocarbons boiling above 210° C. and separated from the heavy black pitch constituents of the petroleum tar are described and claimed, together with heat polymers produced from said polymerizable oils.

In copending application 386,232, filed April 1, 1941, by Waldo C. Ault, which has matured into Patent 2,387,237, granted October 23, 1945, there is described and claimed the production of catalytic resins from the heat polymerizable and/or catalytically polymerizable monomeric hydrocarbons boiling above 210° C. and separated in monomeric form from the heavy black pitch constituents of the petroleum tar.

The high-boiling aromatic oils of the type described may be isolated from the resins obtained from each of these processes.

In the manufacture of oil gas and carburetted water gas, the tar produced is usually in the form of an emulsion due to the condensation of hydrocarbon constituents from the gas in the presence of water simultaneously condensed from the gas or otherwise present.

In copending application 342,735, filed June 27, 1940, by Edwin L. Hall and Howard R. Batchelder, which has matured into Patent 2,366,899, granted January 9, 1945, there is described a method of dehydrating such petroleum tar emulsions and of fractionating the hydrocarbon constituents thereof by rapid distillation with the separation from the heavy pitch constituents of residual tar of a mixture of aromatic hydrocarbons and heat polymerizable unsaturated monomeric aromatic hydrocarbons boiling above 210° C.

In copending application 353,034, filed August 17, 1940, by Howard R. Batchelder, which has matured into Patent 2,383,362, granted August 21, 1945, there is described the dehydration of such petroleum tar emulsions and the fractionation of the hydrocarbon constituents thereof with the recovery of monomeric unsaturated heat polymerizable hydrocarbon constituents and aromatic oils separate from the heavy black pitch constituents of residual tar, by the solvent extraction of the emulsion with a hydrocarbon solvent such as liquefied propane or butane.

Other processes, for example fractional condensation, might be employed to recover these high-boiling aromatic hydrocarbons separate from the heavy black pitch constituents of the tar. Also processes for oil pyrolysis which avoid the formation of emulsions, may be employed for the production of the high-boiling aromatic hydrocarbons. Furthermore, while it may be preferred to employ petroleum oils or cuts therefrom, which are classifiable in classes 5 to 7 inclusive according to Bureau of Mines Report of Investigations 3279 and particularly in class 7, other oils may be employed.

As a result of separation of the light oil and higher-boiling aromatic oil components of the products of such petroleum oil pyrolysis from the residual tar, without polymerization or with materially reduced polymerization, a substantially pitch-free highly aromatic hydrocarbon material may be separated having a portion boiling within the range of from 210 to 450° C., or higher, which may contain from 5% to 30%, and higher, of monomeric unsaturated aromatic hydrocarbons readily polymerizable by heat.

As previously stated, the above mentioned heat polymerizable highly aromatic monomeric material may be readily polymerized by heat to form resins, after which the high-boiling aromatic hydrocarbons may be separated from such resins by any desired method, such as by distillation, which may be assisted by steam and carried out under reduced pressures.

Polymerization may be effected by heating the total material separated from the residual tar sufficiently to polymerize the readily heat polymerizable monomers boiling within the range of from 210° to 450° C., but insufficiently to appreciably polymerize the heat polymerizable material contained in lower boiling ranges, such, for instance, as methyl styrenes and styrene. This may be accomplished, for example, by heating with stirring for 4 hours at 200° C. followed by distillation under vacuum to isolate the resin. The higher-boiling aromatic oils then may be separated by fractional distillation.

It may be preferable, however, to first effect a separation by fractional distillation between light oil boiling below say 210° C. and oils boiling above say 210° C.

The polymerization of the heat polymerizable unsaturated monomeric material in the separated aromatic oils boiling above, say, 210° C. may be effected by heating the oil with stirring, for example, for four hours at 200° C.

The resin thus produced, together with any resin produced during the separation of the light oil from the higher-boiling oil, may then be removed by distillation under vacuum.

As hereinbefore stated, after polymerization the high-boiling aromatic oils may be isolated from the resin by distillation under vacuum which may be assisted by steam.

The high-boiling polymerizable monomeric material derived from tar obtained in the pyrolysis of petroleum, by rapid distillation or solvent extraction methods also may be polymerized prior to the separation of the desired high-boiling aromatic oils by the application of catalysts, either with or without the simultaneous, or otherwise, application of heat, for example, as described and claimed in said copending application, Serial No. 386,232, filed April 1, 1941, by Waldo C. Ault.

Catalysts such as mineral acids, for example, sulfuric acid, hydrogen chloride, acids of phosphorus, or acid-acting metallic halides or complexes of said halides, preferably organic solvent complexes, as for example, boron trifluoride, aluminum chloride, boron trifluoride-diethyl ether complex, boron trifluoride-dimethyl ether complex, boron trifluoride-phenyl ether complex, boron trifluoride-phenyl methyl ether complex, boron trifluoride-dioxan complex, boron trifluoride-toluene complex, corresponding aluminum chloride complexes, and the like, may be employed for this purpose.

The metallic halides and their complexes employed are characterized by their ability to hydrolyze in the presence of water to give an acid reaction and, hence, for convenience they may be termed acid-acting metallic halides.

While high-boiling oils of the type described may be isolated from the tar emulsion by either distillation or solvent extraction methods, as pointed out previously, I prefer to employ high-boiling oils which have been isolated by solvent extraction methods because of the presence therein of very much larger proportions of high-boiling aromatic oils of the type desired. The flash-distillation method of isolating such oils from the tar emulsion may permit the polymerization of a portion of the unsaturated materials to take place, though very greatly less than in conventional methods, thus increasing the quantity of resinous and/or pitch-like materials present. The presence of these polymers effectively reduces the quantity of the aromatic oils, and particularly those having a higher boiling range, which may be isolated from the residual tar or pitch.

While aromatic oils boiling above 210° C. may be produced by conventional methods of distillation of the products of vapor phase oil pyrolysis produced in the manufacture of gas, and may be employed in accordance with the present invention, such aromatic oils are by no means as preferred for this purpose, as are the high-boiling aromatic oils produced by the use of separation methods, which minimize polymerization of the high-boiling heat polymerizable unsaturates.

In conventional distillation methods, the tars are subjected to elevated temperatures for such lengths of time as to polymerize the far greater part, if not all, of the high-boiling heat polymerizable unsaturates. This results in the production of a very highly viscous mass, from which the removal of the higher-boiling non-heat polymerizable aromatic constituents by commercially feasible methods is precluded by very great operating difficulties.

The processes, which minimize or avoid polymerization in the separation of the high-boiling aromatic oil from the tar, thus produce high-boiling aromatic oils which differ from those produced by conventional processes not only in their content of high-boiling heat polymerizable unsaturates, but also in their content of the higher-boiling non-heat polymerizable aromatic constituents. The high-boiling aromatic oils produced by these methods are therefore unique.

In connection with the isolation of these high-boiling aromatic oils by the preferred method, namely, by the solvent extraction of the tar emulsion, it should be emphasized that the mixture of aromatic oils and unsaturated oils obtained by such methods may be fractionally distilled prior to, during, or after polymerization to isolate the aromatic oils having the desired high-boiling range. Separation by distillation prior to polymerization may be preferred in certain cases for reasons more particularly set forth in said copending applications.

Thus, the extracted oils may be distilled prior to polymerization to give a fraction boiling above, for example, say 275–300° C., and a lower boiling fraction. These may be polymerized separately, after which the high-boiling aromatic oils of the type desired may be isolated from the resinous materials obtained.

The process may be further illustrated by the following examples.

Example 1

Petroleum oil gas tar emulsion obtained by the pyrolysis of a Bureau of Mines type 7 naphthenic oil in the presence of steam in a ceramic chamber at temperatures above 1300° F. is extracted with liquid propane. After removal of the propane, the extracted oil is flash distilled to give a fraction boiling almost entirely above 250° C.

This fraction is polymerized by heating to a temperature of 200° C. for a period of 4 hours after which the aromatic oils are isolated by distillation until a vapor temperature of approximately 200° C., or higher, is reached at a pressure of 20 mm. of mercury, absolute.

Example 2

A sample of extracted and distilled oil similar to that employed in Example 1 is polymerized by the addition of 96% sulfuric acid in small portions at temperatures below 50° C. until no further temperature rise is noted. The addition of 1% by weight of acid usually is sufficient to insure complete polymerization.

The acid sludge layer then is removed, either with or without the addition of naphtha to reduce the viscosity of the mixture, and the polymerized material washed and neutralized. The high-boiling aromatic oils then are isolated by distillation under reduced pressure.

Example 3

A sample of extracted and distilled oil similar to that employed in Example 1 is polymerized by the addition of 3% by weight of aluminum chloride-diethyl ether complex at temperatures below 50° C. After the polymerization has been completed, the catalyst is neutralized by the addition of an aqueous alkaline solution. Clay or other desired filter aid then is added and the mass filtered. The filtered material is distilled under reduced pressures to isolate the high-boiling aromatic oils.

Any combination of the foregoing or other methods may, of course, be employed to isolate the high-boiling aromatic oils.

The oils obtained may be employed in resinous and/or plastic compounds or blends without further treatment with excellent results. However, if desired, they may be further refined or treated by any desired method.

Thus, the high-boiling aromatic oils may be refined by washing with one or more portions of sulfuric acid, preferably of 96% concentration, until all, or substantially all, of the colored bodies are removed. The oil then may be contacted with clay or other surface-active agents, if desired, to remove any remaining impurities. Oils ranging in color from a light yellow to water white are readily obtained in this manner, the exact color of the oil obtained depending, among other things, upon the severity of the refining operation employed.

Other refining methods may, of course, be employed if desired, either alone or in conjunction with acid washing, or otherwise. Thus, the high-boiling aromatic oils may be contacted with, or percolated through, activated clay or other surface active agent.

I have discovered that aromatic oils of the type described herein preferably have the preponderant part thereof boil above at least 250° C., and particularly above at least 275° C., in order to insure the production of polyacrylic and/or polymethacrylic resin compositions having unusually desirable properties. Excellent results are obtained when aromatic oils of the type described having the preponderant part thereof boiling above at least 300° C., more particularly above 325° C., and still more particularly above at least 340° C., are employed.

In addition, such oils are preferred which have mixed aniline points below 15° C., and more particularly below 10° C. A mixed aniline point of a given oil is defined as the critical solution temperature of a mixture of 10 cc. of anhydrous aniline, 5 cc. of the oil being tested, and 5 cc. of a naphtha having a straight aniline point of 60° C.

Such oils also are preferred which contain not less than 95% and more particularly not less than 97%, of aromatic hydrocarbons to insure complete compatibility with certain resinous and/or plastic materials.

Such oils are preferred which have densities of not less than 0.95 and, more particularly, not less than 1.0.

These values represent preferred characteristics of aromatic oils of the type described herein for the preparation of resinous and/or plastic compositions.

Excellent results have been obtained employing high-boiling aromatic oil produced under such conditions of oil pyrolysis and under such conditions of separation from the resulting petroleum oil gas tar, that the material boiling above 210° C., when and as separated from the pitch constituents of the tar, contained at least 5%, and preferably at least 10% and still more preferably at least 20% or higher of heat polymerizable unsaturates.

As pointed out previously, high-boiling aromatic oils of the type described which have been found to be particularly adapted for use as a softener and/or plasticizing agent for polyacrylic and/or polymethacrylic resins may be isolated from the tar or tar emulsion obtained as a result of the pyrolytic decomposition of petroleum, or a fraction thereof, by the flash distillation or more preferably the solvent extraction of the tar or tar emulsion. The extract obtained may be separated into a high-boiling and a low-boiling fraction, if desired, after which the high-boiling fraction, or the overall extract, may be subjected to polymerization to remove the unsaturated materials present. The oil obtained from such operations then may be refined, such as by sulfuric acid washing and/or other refining operations, after which the oil may be used as such, or it may be further distilled and/or fractionated, or it may be processed otherwise.

The oil obtained from the polymerizing operation, after separation of the polymers, also may be used as such without further refining, and such unrefined oil may be fractionated prior to use, if desired.

The oil obtained from the polymerizing operation also may be treated with clay or other surface active agent, either before or after separation from the polymers, followed by filtration and/or distillation, if desired. Successive clay treatments may be employed.

The mixture of oil and resin obtained from the polymerizing operation also may be used as such for the preparation of resinous and/or plastic compositions, and such mixture may be refined such as by clay contacting prior to use if desired.

The oil separated from the tar or tar emulsion by flash distillation or preferably by solvent extraction methods followed by distillation to separated materials boiling below 275° C. or, more particularly, below 300° C., if desired, and containing higher-boiling aromatic hydrocarbons and unpolymerized or partially polymerized unsaturated aromatic hydrocarbons, may be used as such for the preparation of resinous compositions of the type described, or it may be refined by any desired method such as clay contacting prior to use.

As the unpolymerized aromatic material present in such mixture is extremely heat sensitive, practically all of the unsaturated aromatic hydrocarbons present may be, if desired, converted to resinous polymers during the mixing, blending, or other operations incident to the preparation of the resin composition.

Accordingly, the mixture of aromatic hydrocarbons including unsaturated aromatic hydrocarbons obtained from the tar or tar emulsion by flash distillation or preferably by solvent extraction methods followed by distillation may be used as such for the preparation of compositions of the type described herein, provided preferably that the preponderate portion thereof boils above 250° C., or such mixture may be partially or completely polymerized prior to use. The partially or completely polymerized mixture also may be distilled to remove a part or all of the resinous polymer, after which the distillate may be distilled and/or refined if desired prior to use.

The invention in its broad aspect, therefore, includes the employment of a high-boiling aromatic oil of petroleum oil gas tar origin of the type described as an ingredient in polyacrylic and/or polymethacrylic resin compositions either in admixture or not with unsaturated aromatic hydrocarbons boiling in the same or neighboring boiling ranges and/or resinous polymers derived from such unsaturated aromatic hydrocarbons.

Examples of polyacrylic and/or polyalkylacrylic materials with which aromatic oils of the type described herein may be compounded are:

(1) Polymerized acrylic compounds such as acrylic acid; acrylic acid esters such as methyl acrylate, ethyl acrylate, propyl acrylate, allyl acrylate; acrylic nitrile; and chloroethyl acrylate.

(2) Polymerized alkyl acrylic compounds such as methacrylic compounds, for example, alpha methacrylic acid, alpha methacrylic acid esters, such as methyl methacrylate, ethyl methacrylate, propyl methacrylate, copolymers of alpha methacrylic acid esters such as copolymer of ethyl methacrylate and methyl methacrylate; esters of beta methacrylic acid, for example the methyl, ethyl and allyl esters; methacrylic nitrile; and chloromethyl methacrylate.

(3) Acrylate-alkyl acrylate copolymers, such as the copolymers obtained by the copolymerization of one or more acrylic compounds with one or more alkyl acrylic compounds, such as methyl acrylate-methyl methacrylate copolymers.

(4) Copolymers of acrylate and/or alkyl acrylate compounds, such as those obtained by the copolymerization of one or more acrylate and/or alkyl acrylate compounds with one or more unsaturated and/or reactive compounds, such as vinyl derivatives, as for example vinyl chloride and vinyl acetate, vinylidene derivatives, such as vinylidene chloride, unsaturated hydrocarbons, such as styrene and substituted styrenes, and the like.

In general, aromatic oils of the type described are added to the resins above to (a) improve their flexibility, (b) reduce their softening point, (c) reduce their viscosity, (d) improve their working properties, and/or (e) impart tackiness and improve the adhesive properties of the resin.

Other plasticizing agents may be used in conjunction with aromatic oils of the type described herein.

However, I generally prefer to employ aromatic oils of the type described herein alone as plasticing agents for polyacrylic and polymethacrylic resins. When one or more secondary plasticizing agents are employed in conjunction with aromatic oils of the type described herein in the preparation of resin-plasticizer compositions, I prefer to have the said aromatic oils as the preponderating constituent of such mixture of plasticizing agents.

It should be emphasized that aromatic oils of the type described herein may not be compatible with all resinous materials of the type described in all proportions. Consequently, care preferably should be exercised in using a given resin in order not to exceed the compatibility limits of the respective components if a clear coating film, or mixture, is desired. In case a non-homogeneous mixture is obtained, the addition of a secondary plasticizing agent more completely soluble in both the resin and the aromatic oil usually will be found to result in the formation of a completely homogeneous mixture. The use of a third component, other than a plasticizing agent, as a solubilizing agent will be found to be advantageous in certain cases.

In certain cases, also, an opaque film, coating or article is not detrimental and may even be desired. In such cases, the use of aromatic oils of the type described in proportions above the compatibility limits is indicated.

It is apparent, therefore, that a proper choice of the type of resin and the ratio of resin to aromatic oil will enable one skilled in the art to prepare compositions possessing desired flexibility, softening point, viscosity, consistency, tackiness, and adhesiveness at will.

While any desired ratio of resin to aromatic oil may be employed, for many applications, I prefer to have the resin comprise at least 50% of the resin-plasticizer mixture, although larger proportions of aromatic oil may be employed in certain applications such as, for example, in the preparation of adhesives.

Excellent results may be obtained in many cases where the resin comprises at least 70% of the resin-aromatic oil mixture.

It is to be understood, of course, that varying quantities of aromatic oils of the type described may be employed, the quantity used, in general, depending largely upon the result desired. Thus the use of relatively large quantities of aromatic oil will increase the flexibility and extensibility of a given resin substantially while at the same time reducing its softening point somewhat.

The aromatic oil and resin may be compounded in any desired manner, such as by (1) mixing the molten resin and the aromatic oil, (2) the use of a mutual solvent, and (3) compounding at room or elevated temperature in the absence of a solvent by the use of a two-roll mill, a Banbury mixer, or otherwise. Any combination of the foregoing methods also may be employed, if desired.

In hot-melt mixing, I generally prefer to add the resin to the aromatic oil with good agitation. Other procedures may, of course, be employed.

In case a solvent is incorporated in the resin-aromatic oil mixture, one which is capable of forming a clear solution preferably is chosen. However, in certain cases it may be desired to add only a sufficient quantity of solvent to reduce the softening point of the mixture, or to form a paste of varying consistency, in which case the degree of solubility of the resin and/or aromatic oil in the solvent is of less importance.

Suitable solvents may be selected from the hydrocarbons or from hydrocarbon fractions, such as benzene, toluene, xylene, solvent naphtha, mineral spirits, V. M. & P. naphtha, hydrogenated hydrocarbon solvents, and the like, chlorinated solvents, such as ethylene dichloride, chloroform, and carbon tetrachloride, and miscellaneous organic solvents, such as esters and ketones. As many of the resins are quite soluble in aromatic solvents, such solvents are preferred for the preparation of resin-aromatic oil solutions to be used in certain specific applications. However, the use of other solvents, such as petroleum hydrocarbon fractions, in admixture with aromatic solvents will be found to be satisfactory in many cases.

As pointed out previously, acrylic and/or methacrylic compounds may be copolymerized with vinyl and/or vinylidene compounds. Examples of vinyl compounds which may be so employed are vinyl chloride, vinyl bromide, vinyl acetate, vinyl propionate, vinyl butyrate, vinyl acetal, and vinyl butyral. The corresponding vinylidene compounds may also be so employed.

Other resin or plastic forming materials may be employed with acrylic, and/or methacrylic materials.

As pointed out previously, the field of usefulness of polyacrylic and/or polymethacrylic resin-aromatic oil compositions may be largely increased by incorporating rubber, either natural or artificial, or derivatives or modifications thereof, in such compositions. Examples of such materials are natural rubber, such as raw plantation crepe, latex, and the like; reclaimed rubber; synthetic rubbers or elastomers, such as those obtained by the polymerization of butadiene, or other diolefines, either alone or in admixture, or the copolymerization of one or more diolefines with one or more unsaturated or reactive materials, such as styrene, methyl styrene, acrylic nitrile, isobutylene, and the like, or by the polymerization of one or more substituted diolefines, such as 2-chloro-butadiene-1,3, either alone or in admixture with other unsaturated and/or reactive materials, and other synthetic elastomers; substituted and/or modified natural and/or synthetic rubbers, such as chlorinated rubber; olefine-polysulfide type rubbers; resinified rubber; factice; and the like.

While rubber or rubber-like materials may be added to resin-aromatic oil compositions in the solid state, I generally prefer to incorporate a solution of one or more of the ingredients with the remaining ingredients. An alternative method comprises blending solutions of the various components.

Rubber also may be added to the polyacrylic and/or polymethacrylic resin-aromatic oil composition, in solid form or in the form of a solution, for example in the form of a rubber cement, which generally comprises a solution of rubber in a suitable solvent, which may contain other ingredients.

The field of utilization of polyacrylic and/or polymethacrylic resin-aromatic oil compositions also may be enlarged substantially by the incorporation therein of one or more drying oils.

Examples of such oils are linseed oil, tung oil, oiticica oil, perilla oil, soya bean oil, cashew nut oil, fish oil, menhaden oil, sardine oil, synthetic and/or modified drying oils, and the like. Such drying oils may be bodied prior to, during, or after the addition of the resin-aromatic oil composition. In addition, one or more of the ingredients, such as the resin, may be incorporated in the drying oil or bodied drying oil, prior to the addition of the other ingredient, or ingredients.

It should be emphasized however, that certain of the acrylate and/or methacrylate resins are only very sparingly soluble in drying oils. Consequently, due consideration should be given to this lack of compatibility in certain cases when preparing formulations of this type.

In case a drying oil is incorporated in the resin-aromatic oil composition, driers may be added if desired in order to assist in hardening the drying oil after application. Examples of suitable driers are the lead, cobalt, and manganese salts of high molecular weight organic acids, such as rosin acid or naphthenic acids. Litharge or other drying agents, such as japan driers, also may be employed.

Polyacrylic and/or polymethacrylic resin-aromatic oil-drying oil compositions may be prepared and used without further modification, although other ingredients also may be incorporated therein, such as solvents.

Both rubber and drying oils may be incorporated in polyacrylic and/or polymethacrylic resin-aromatic oil compositions for use in certain specialized applications. In general, it may be said that rubber improves the adhesive properties of the mixture, while the drying oil improves the mechanical strength and solvent resistance of the composition after application.

As indicated previously, other ingredients may be added to the resin aromatic oil composition, either alone, or in combination, or in conjunction with the addition of rubber and/or drying oil. Examples of such additives are pigments, fillers, extenders, organic dyes, antioxidants, antiskinning agents, and the like.

Suitable pigments include red lead, vermilion, cadmium red, Venetian red, chrome yellow, cadmium yellow, zinc yellow, iron yellow, ochre, umber, ultramarine blue, iron blue, emerald green, chrome green, titanium dioxide, carbon black, lampblack, iron oxide black, manganese black, lithopone, white lead, zinc white, various metallic pigments such as aluminum and bronze powders, and the like.

Examples of fillers, and extenders are whiting, barytes, kaolin, blanc fixe, gloss white, asbestos, mineral wool, rock wool, and the like.

Organic colors which may be employed as additives include basic dyes such as methyl violet, victoria blue, malachite green, brilliant green, magenta, thioflavine, auramine, and the like; acid dyes such as sulfonic or carboxylic acid derivatives of color bases; mordant dyes; and pigment dyes such as azo dyes, vat dyes, and phthalocyanine compounds.

Examples of antiskinning agents and antioxidants are dipentene, catechol, hydroquinone, and secondary aryl amines, such as phenyl alpha naphthylamine. In general, antiskinning agents and antioxidants are used only when drying oils have been incorporated in the resin-aromatic oil composition.

Waxes also may be incorporated in polyacrylic and/or polymethacrylic resin-aromatic oil compositions of the type described herein, of which paraffin may be considered to be the most important. Examples of other waxes and waxy materials which may be blended with resin-aromatic oil compositions of the type herein disclosed are bayberry wax, ozokerite, Rilan wax, spermaceti, stearic acid, lanette wax, lanolin, montan wax, Japan wax, cetyl alcohol, esters of cetyl alcohol, ceresin, candelilla wax, carnauba wax, beeswax, sugar cane wax, Chinese insect wax, cottonseed wax, flaxseed wax, palm wax, wool wax, cetyl cerotate, cetyl acetate, cetyl palmitate, ethyl palmitate, lauryl laurate, methyl stearate, and glyceryl stearate. Derivatives of the foregoing, or other waxes also may be employed, such as the chlorinated paraffins.

Care should be exercised not to exceed the compatibility limits of the selected wax in the resin-aromatic oil composition if a perfectly clear coating or coating film is desired.

Polyacrylic and/or polymethacrylic resin-aromatic oil compositions of the type described herein are well adapted for use in a large number of industrial applications, due principally to the unique properties of the high-boiling aromatic oils employed in their preparation. Thus, such compositions may be used (1) to treat, coat, and/or impregnate fibrous materials in general, such as paper and textiles, (2) to waterproof, impregnate and/or finish leather, either natural or artificial, (3) as adhesives and binding agents, (4) to form putties, caulking agents, and sealing compounds, (5) as film forming compositions, (6) for the preparation of inks, (7) for the preparation of both hot and cold molding compositions, and (8) for the preparation of resinous and/or plastic blocks, sheets, rods, tubes, foil, filament, molding compositions and the like.

Modifying agents may be incorporated in the resin-aromatic oil compositions which are to be used for any desired application, if desired. Thus, for example, resin-aromatic oil compositions which are to be used to coat and/or impregnate fibrous materials may contain rubber, drying oils, solvents, and/or waxes.

Polyacrylic and/or polymethacrylic resin-aromatic oil compositions of the type described herein, either alone or in conjunction with certain modifying agents, are excellent water-proofing, coating, impregnating, and/or finishing agents for a wide variety of fibrous materials. Thus, for example, such compositions may be used to coat and/or impregnate felts to be used as floor, wall, or roof coverings. Such compositions frequently contain one or more pigments, coloring agents, fillers, and/or extenders.

Resin-aromatic oil compositions employed to waterproof, impregnate, and/or finish leather frequently contain one or more waxes and may contain solvents, pigments, and/or coloring agents.

Resin-aromatic oil compositions are frequently employed as adhesives or binders without the addition of any modifying agents. Such adhesives are of the hot-melt type, that is, the resin-aromatic oil composition is softened or melted by the application of heat prior to or during its application to the surfaces to be joined.

Solvents also may be incorporated in such compositions, if desired.

The use of polyacrylic and/or polymethacrylic resin-aromatic oil compositions of the type described herein for such adhesive purposes will be found to be unusually satisfactory due mainly to the unique characteristics of the aromatic oil employed. Such compositions may be used in the fabrication of cardboard, to join paper or cardboard to form containers or other objects, for the preparation of laminated objects or units, such as laminated wood, and the like.

Such compositions will be found to be particularly useful in the fabrication of cardboard containers formed by rolling a sheet of kraft, or other, paper over a cylindrical form, the adhesive being applied continuously, or otherwise, to unite the continuous, or other, plies to form a container of the desired size and rigidity. Due to the excellent waterproofing qualities of the adhesives, the container obtained usually requires no further waterproofing, thus eliminating one operation in the manufacture of containers which are to be used for outdoor applications.

In addition, resin-aromatic oil compositions of the type described herein also may contain fillers, such as starch, asbestos, and the like, rubber, pigments, coloring agents, solvents, and similar materials. Special adhesives for specific applications may be formulated by the addition of one or more of such modifying ingredients to resin-aromatic oil compositions of the type described herein.

Polyacrylic and/or polymethacrylic resin-aromatic oil compositions prepared from aromatic oils of the type described herein also find wide application in the formulation of putties, caulking agents, and sealing compounds. Putties and caulking compounds also frequently contain drying oils, fillers, such as clay, bentonite, kaolin, asbestos, and the like, pigments, organic coloring agents, solvents, and similar materials.

Sealing compounds frequently contain drying oils, rubber, fillers, pigments, and the like, in addition to the resin and aromatic oil.

Resin-aromatic compositions of the type described herein are particularly well adapted for use as film forming compositions to coat a wide variety of surfaces, such as those of wood, metal, fibrous materials, ceramic materials, such as concrete, brick, stone, stucco, and plaster, and the like. Such compositions frequently are employed in the absence of any modifying agent, being applied in a softened or molten condition to the surface to be coated.

Thus, a composition comprising a polyacrylic and/or polymethacrylic resin and an aromatic oil of the type described herein, may be softened or melted by the application of heat, after which it may be applied, such as by dipping, brushing, or spraying, to the surface of metallic objects, particularly those of iron or steel, to form a protective layer thereon.

Pigments or fillers may be incorporated in the resin-aromatic oil coating compositions of the type disclosed herein, as well as solvents, drying oils, organic coloring agents, and the like. Sufficient pigments and fibers, such as asbestos, may be added to give a composition possessing a definite fibrous structure. Such compositions usually are applied by means of a trowel, or by similar methods.

Compositions comprising an aromatic oil of the type described herein, a resin of the kind described, and a drying oil, preferably bodied, find application in the coating industry. Such compositions may contain a solvent, preferably one of a hydrocarbon nature.

Resin-aromatic oil compositions of the type disclosed herein may be used as ink bases. Pigments and/or coloring agents usually are added, such as lampblack, Venetian red, chrome yellow, and the like. Drying oils may be incorporated in such inks and they may contain solvents, particularly those of an aromatic hydrocarbon type.

Other applications for resin-aromatic compositions of the type disclosed herein will, of course, suggest themselves to persons familiar with the art upon an inspection of the foregoing disclosure.

The invention may be further illustrated by means of the folowing examples:

Example 4

Thirty parts of an aromatic oil of the type described herein, and having an initial boiling point above 300° C., are thoroughly incorporated with 70 parts of polymerized methyl methacrylate. A clear, plasticized composition is obtained, which may be molded to give a clear molded object.

By the incorporation of a solvent in the composition, a clear coating composition is obtained. Upon applying this to a tin panel, and permitting the solvent to evaporate, a clear coating film is obtained.

Example 5

A mixture of 70 parts of methyl methacrylate resin and 30 parts of an aromatic oil of the type described herein and having an initial boiling point of approximately 300° C. is heated with agitation, until a uniform mixture is obtained.

Upon applying this composition to a fibrous material, such as cloth, felt, paper, or leather, a satisfactory waterproof finish is obtained.

Example 6

Upon applying a resin-aromatic oil composition of the type described in Example 5 to a number of plies of paper in a molten condition, and uniting the plies under pressure, a laminated block of paper is secured.

Example 7

An ink is prepared by thoroughly blending 25 parts of a methyl methacrylate resin, 20 parts of carbon black, and 55 parts of an aromatic oil of the type described herein and boiling above 250° C.

Aromatic hydrocarbon oils of the type described because of their unusually high solvent power are particularly outstanding in their ability to disperse other additives. Their low surface tension promotes unusual wetting power, which in turn greatly adds rapid dispersion. Thus both relatively high solvent power and relatively high dispersion power combine to make aromatic oils of the type described singular and unique.

These properties are of greatest importance in plasticizing and compounding operations insuring not only the desired dispersion of the aromatic oil itself and any other additive, but also such dispersion in a relatively short time and in a relatively easy manner thus avoiding the necessity of prolonged working or milling, such as is required with many other plasticizing and softening agents. The compatibility of my aromatic oils with resins of the type under discussion is unusually outstanding, yielding products of greatly improved characteristics.

For example, their high solvent power and compatibility with these resins results in greater transparency, a property important in many uses to which resins of this type are put.

Generally speaking, lower viscosities for the same amount of material used may be obtained when using my aromatic oils. This is of outstanding importance in the formulation of cements and of coating compositions, for example, for the coating of fabrics for the same viscosity as higher content of solids or, in other words, of resins.

As previously pointed out, the unusually good properties possessed by polyacrylic and/or polymethacrylic resin-aromatic oil compositions prepared from aromatic oils of the type disclosed herein are largely due to the unique properties of such aromatic oils. Among these desirable properties may be mentioned (1) their comparative freedom from extraneous materials, (2) their excellent solubility and compatibility characteristics, (3) their relatively low viscosity and viscosity-imparting characteristics, and (4) their stability.

My above-described resin-aromatic oil compositions are particularly well adapted for the coating and/or impregnation of organic fibrous materials in general including vegetable and animal fibers such as hair, leather and the like.

In the specification and in the claims, the term "aromatic oil" unless otherwise modified is intended to include the unrefined or refined oil separated from tar formed during the production of combustible gas by processes involving the pyrolytic decomposition of petroleum oil with or without the aid of catalysts.

While various procedures and formulas have been particularly described, these are of course subject to considerable variation. Therefore, it will be understood that the foregoing specific examples are given by way of illustration, and that changes, omissions, additions, substitutions and/or modifications might be made within the scope of the claims without departing from the spirit of the invention, which is intended to be limited only as required by the prior art.

I claim:

1. As a new composition of matter, one of a group consisting of polyacrylic and polymethacrylic resins, and a substantially pitch-free aromatic hydrocarbon oil boiling above 210° C. and having been physically separated from tar obtained in the vapor phase pyrolysis at average temperatures above 1300° F. of petroleum oil in the production of combustible gas, said aromatic hydrocarbon oil having an aromatic hydrocarbon content of at least 95%, and a density of at least 0.95.

2. As a new composition of matter, a resinous polymer of an ester of methacrylic acid and a substantially pitch-free aromatic hydrocarbon oil boiling above 250° C. and having been physically separated from tar produced in the vapor phase pyrolysis at average temperatures above 1300° F. of petroleum oil in the production of combustible gas, said aromatic hydrocarbon oil having an aromatic hydrocarbon content of at least 97%, and a density of at least 1.0.

3. As a new composition of matter, a resinous polymer of an ester of acrylic acid, and a substantially pitch-free aromatic hydrocarbon oil boiling above 250° C. and having been physically separated from tar produced in the vapor phase pyrolysis in the production of combustible gas at average temperatures above 1300° F. of petroleum oil classified as #7 by the Bureau of Mines method of classification set forth in Bureau of Mines Report of Investigations 3279, said aromatic hydrocarbon oil having an aromatic hydrocarbon content of at least 97%, and a density of at least 1.0.

4. As a new composition of matter, polymethyl methacrylate resin and a substantially pitch-free aromatic hydrocarbon oil boiling above 250° C. and having been physically separated from tar produced in the vapor phase pyrolysis in the production of combustible gas at average temperatures above 1300° F. of petroleum oil classified as #7 by the Bureau of Mines method of classification set forth in Bureau of Mines Report of Investigations 3279, said aromatic hydrocarbon oil having an aromatic hydrocarbon content of at least 97%, and a density of at least 1.0.

5. As a new composition of matter one of a group consisting of polyacrylic and polymethacrylic resins admixed with a hydrocarbon resin produced by the polymerization of substantially pitch-free unsaturated polymerizable aromatic hydrocarbon material boiling in the range of 210° C. to 450° C., and a substantially pitch-free aromatic hydrocarbon oil boiling between 210° C. and 450° C., said aromatic hydrocarbon oil having an aromatic hydrocarbon content of at least 97%, and a density of at least 0.95, said unsaturated polymerizable aromatic hydrocarbon material and said aromatic hydrocarbon oil having been physically separated from tar produced in the vapor phase pyrolysis at average temperatures above 1300° F. of petroleum oil in the production of combustible gas.

6. As a new composition of matter a resinous polymer of methyl methacrylate admixed with a hydrocarbon resin produced by the polymerization of substantially pitch-free unsaturated polymerizable aromatic hydrocarbon material boiling in the range of 210° C. to 450° C., and a substantially pitch-free aromatic hydrocarbon oil boiling between 210° C. and 450° C., said aromatic hydrocarbon oil having an aromatic hydrocarbon content of at least 97%, and a density of at least 0.95, said unsaturated polymerizable aromatic hydrocarbon material and said aromatic hydrocarbon oil having been physically separated from tar produced in the vapor phase pyrolysis at average temperatures above 1300° F. of petroleum oil in the production of combustible gas.

7. A composition of matter comprising one of a group consisting of polyacrylic and polymethacrylic resins admixed with a substantially pitch-free aromatic hydrocarbon oil boiling between 300° C. and 450° C. and having been physically separated from tar produced in the vapor phase pyrolysis at average temperatures above 1300° F. of petroleum oil in the production of combustible gas, said aromatic hydrocarbon oil having an aromatic hydrocarbon content of at least 97% and a density of at least 0.95.

8. A composition of matter comprising one of a group consisting of polyacrylic and polymethacrylic resins admixed with a substantially pitch-free aromatic hydrocarbon oil boiling between 325° C. and 450° C. and having been physically separated from tar produced in the vapor phase pyrolysis at average temperatures above 1300° F. of petroleum oil in the production of combustible gas, said aromatic hydrocarbon oil having an aromatic hydrocarbon content of at least 97% and a density of at least 0.95.

FRANK J. SODAY.